United States Patent [19]

Bauer et al.

[11] Patent Number: 4,512,958

[45] Date of Patent: * Apr. 23, 1985

[54] METHOD OF RECOVERING MOLYBDENUM OXIDE

[75] Inventors: Günter Bauer, Fürth; Joachim Eckert, Zirndorf, both of Fed. Rep. of Germany

[73] Assignee: GfE Gesellschaft für Elektrometallurgie mbH, Düsseldorf, Fed. Rep. of Germany

[*] Notice: The portion of the term of this patent subsequent to Apr. 5, 2000 has been disclaimed.

[21] Appl. No.: 546,510

[22] Filed: Oct. 28, 1983

[51] Int. Cl.³ .............................................. C01G 39/02
[52] U.S. Cl. ........................................ 423/55; 423/53; 423/159; 423/161; 423/166
[58] Field of Search ................... 423/53, 55, 159, 161, 423/166

[56] References Cited

U.S. PATENT DOCUMENTS

| | | | |
|---|---|---|---|
| 3,656,888 | 4/1972 | Barry et al. | 423/606 |
| 3,714,325 | 1/1973 | Bloom et al. | 423/53 |
| 3,833,352 | 9/1974 | Vojkovic | 423/606 |
| 3,911,076 | 10/1975 | Probert et al. | 423/53 |
| 4,165,362 | 8/1979 | Reynolds | 423/53 |

*Primary Examiner*—Herbert T. Carter
*Attorney, Agent, or Firm*—Karl F. Ross; Herbert Dubno

[57] ABSTRACT

A method of recovering molybdenum oxide as in U.S. Pat. No. 4,379,127 wherein, however, the temperature in the autoclave and the pressure therein are controlled within narrow ranges by increasing the suspension density of the molybdenum sulfide suspension fed to the autoclave upon a fall in temperature and by adding water to the slurry of molybdenum sulfide concentrate formed before introduction into the autoclave upon an increase in temperature.

1 Claim, 1 Drawing Figure

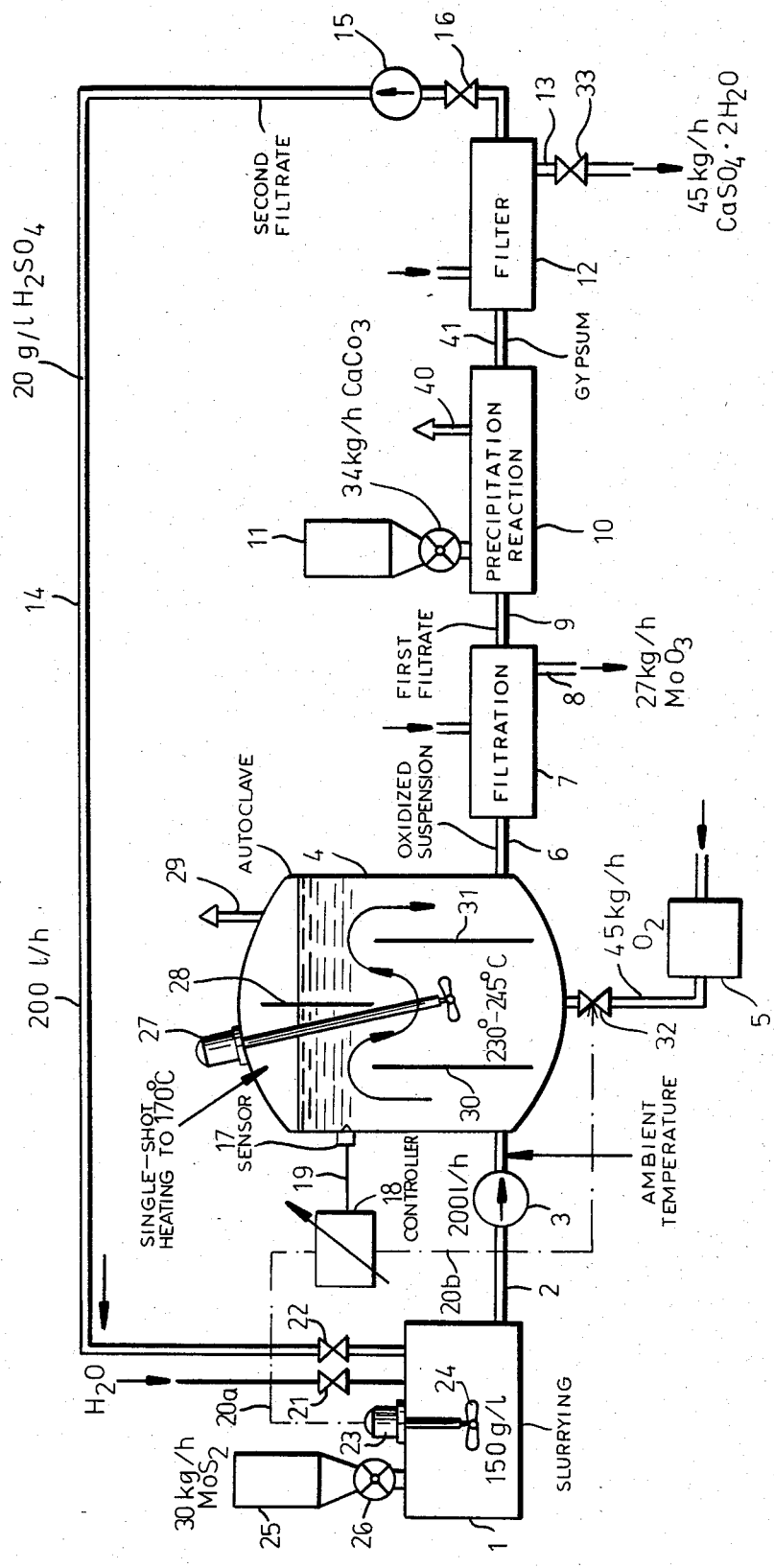

METHOD OF RECOVERING MOLYBDENUM OXIDE

FIELD OF THE INVENTION

Our present invention relates to a method of recovering molybdenum oxide and, more particularly, to an improvement upon the method described and claimed in our U.S. Pat. No. 4,379,127 issued Apr. 5, 1983 and based, in turn, upon German Patent Document No. 31 28 921.

BACKGROUND OF THE INVENTION

The aforementioned patent describes a method of recovering molybdenum oxide by oxidation of a molybdenum sulfide aqueous concentrate slurry containing impurities and in which the molybdenum concentrate has an average particle or grain size of 20 microns to 90 microns, preferably about 70 microns.

In this method, the contaminated molybdenum sulfide concentrate is slurried in the slurrying stage with water to form an aqueous suspension which is introduced into an autoclave and subjected to an oxidation process at elevated temperature and with an elevated oxygen partial pressure. In the reaction, the molybdenum sulfide is transformed into molybdenum oxide and sulfuric acid by a reaction scheme outlined in the aforementioned patent. The reacted suspension is discharged from the autoclave and the molybdenum oxide is filtered from the reacted suspension and the first filtrate which is thus obtained and which contains sulfuric acid, is neutralized with lime or calcium carbonate to form gypsum (calcium sulfate dihydrate), whereupon the suspension is filtered to remove the gypsum therefrom and the resulting second filtrate is recirculated to the slurrying stage.

It will be understood that the neutralization to form gypsum, to be strict, is only a partial neutralization and further that the molybdenum sulfide concentrate is prepared and introduced in consideration of the capacity of the apparatus and the amount of molybdenum oxide to be generated.

The throughput of the molybdenum compounds is thus dependent upon the size and configuration of the apparatus.

Make-up water is introduced to cover amounts which may be lost in the recovered molybdenum oxide and gypsum.

In an earlier process described in German Patent No. 28 30 394, not only is the second filtrate recirculated but a two-stage recirculation is provided. In a first recirculation stage, the reacted suspension after oxidation and before filtering off the molybdenum oxide is recirculated to the slurrying stage and is combined with an additional quantity of molybdenum sulfide concentrate before the mixture of the recycled suspension and additional molybdenum sulfide concentrate is returned to the autoclave.

This recirculation continues until the sulfuric acid content of the slurry is about 80 to 120 g/l. Only then is the molybdenum oxide filtered from the multiple recirculated suspension.

The second recirculation stage recirculates a product following the precipitation of gypsum. More particularly, the first filtrate obtained from filtering off molybdenum oxide is neutralized with the formation of calcium sulfate to a pH value in the range of 0.9 to 1.5 and preferably close to 0.9. The gypsum which is thereby produced is filtered off leaving a second filtrate which is recirculated to the slurrying stage and therefore combined with additional quantities of molybdenum sulfide concentrate before the resulting mixture is again fed to the autoclave. This double recirculation continues until the impurity elements in the second filtrate build up to a sufficiently high level as to warrant their recovery and restarting of the process.

In this earlier system, moreover, the impurity-enriched second filtrate is neutralized to a pH of about 2.5 with an alkali hydroxide and this second filtrate is returned to the autoclave where it is again subjected to oxidation with oxygen to precipitate out iron molybdate. The iron molybdate is filtered off and the filtrate is then subjected to further processing to recover the various impurity elements contained therein.

The latter process has been found to be highly satisfactory because the recirculation generates a sufficiently high level of impurities that such impurities can be readily recovered. The first recirculation which involves the recirculation of molybdenum oxide contributes to the avoidance of encrustation in the autoclave. The recycled filtrate is sufficiently hot so that external heat need not be provided and contributes to the maintenance of the otherwise exothermic reaction in the autoclave ($MoS_2 + 9O_2 + 2H_2O = MoO_3 + 2H_2SO_4$).

In this system the suspension has a suspension density of about 50 to 75 g/l.

However, with this system, because of the multiple recycling operations, an apparatus for producing a given quantity of molybdenum oxide must be considerably larger than is desired and the energy which must be introduced, in spite of the exothermicity of the reaction, because of the recirculation of dense fluids, is comparatively large.

In order to avoid these disadvantages, in our aforementioned U.S. patent we have provided a method in which for an apparatus of a given size a particularly high throughput can be obtained, i.e. the efficiency of the apparatus is far more pronounced. Consequently, for a given output, the apparatus can be simplified and the energy input can be reduced.

In our prior patent, this is obtained by operating the oxidation stage with a suspension whose suspension density is in the range of 100 to 150 g/l and such that only the second filtrate obtained by neutralization of the first filtrate and filtering or separation of gypsum therefrom is recirculated. Important to the invention there described is that the second filtrate be recycled in such quantity that the suspension density of the suspension fed to the autoclave is maintained in the aforementioned range of 100 to 150 g/l.

Experience with our earlier system, however, has shown that in practice the composition of the molybdenum sulfide concentrate varies with time, e.g. by changes in the gangue components, or by changes in the flotation-oil content. These variations in composition lead to undesired temperature variations in the autoclave which complicate the earlier system and prevent the meticulous control of the autoclave temperature which is required.

OBJECTS OF THE INVENTION

It is the principal object of the present invention to provide a method which improves upon the system described in our U.S. Pat. No. 4,379,127 by simply and conveniently controlling the temperature in the autoclave.

Another object of this invention is to provide an improved method for recovering molybdenum oxide wherein the efficiency of the apparatus can be improved or, for an apparatus of given size and energy consumption, the output in terms of molybdenum oxide can be improved.

Still another object of this invention is to provide a method which overcomes the disadvantages of the earlier systems and, indeed, which in a simple and economical way permits control of crucial reaction parameters.

SUMMARY OF THE INVENTION

These objects and others which will become apparent hereinafter are attained, in accordance with the present invention in a method which is based upon our discovery that a particularly convenient, simple and economical control for the temperature and therefore the pressure in the autoclave can be effected in response to the suspension density. More particularly, we provide that, with a fall of the temperature in the autoclave, the suspension density is increased and with an increase of the temperature in the autoclave, water is added to reduce the suspension density at the slurrying stage upstream of the autoclave. In other words the temperature in the autoclave is monitored and the suspension density is controlled in response thereto, preferably within the range given earlier but with a variability depending upon temperature in the manner described.

Since the response that the autoclave to changes in the suspension density at the slurrying stage is comparatively slow, i.e. the lag time or response delay is comparatively long, depending upon the reaction requirement, a rapid response control can also be provided.

In this case, to respond to sudden or brief changes in temperature, the invention provides for control of the temperature by adjusting the oxygen partial pressure so that, with a temperature drop within the autoclave, the oxygen partial pressure is briefly and commensurately raised while, with an increase in the temperature in the autoclave, the oxygen partial pressure is commensurately reduced.

Best results are obtained when the temperature within the autoclave is maintained by these control systems at 230° to 245° C. while the oxygen partial pressure is maintained within the range of 1 to 5 bar, although variability is permitted within this range for the control purposes described.

Apart from these modifications, the apparatus can be constructed and arranged in the manner described in our U.S. Pat. No. 4,379,127, the parameters of the method can conform to the parameters set forth in this patent and in general both the apparatus and the method of the patent can remain the same. The method of the invention operates with a single stage recirculation with autogenous temperature control, i.e. without temperature regulation by coolers, heaters or the like which are external to the autoclave.

The suspension density can be varied by simply modifying the amount of water which is mixed with the slurry and the control of the oxygen partial pressure can be effected simply by throttling or increasing the rate at which oxygen is fed to the autoclave and the pressure at which oxygen is fed to the autoclave.

Mention may also be had of the process for recovering molybdenum oxide from a molybdenum sulfide concentrate with single stage recirculation in German Open Application (DE-OS 20 43 874).

In this system the particle or grain size may be up to 20 microns and is preferably about 5 microns for the molybdenum sulfide. In this process, moreover, the filter keg after the first filtration and containing the molybdenum oxide contains traces of molybdenum sulfide and inert impurities and is further treated. In addition, the neutralization of the first filtrate results in solubilization of molybdenum oxide and this must be recovered from the filter keg of the second filtration. Temperature control by regulating the suspension density is not described and, indeed, this systems requires external heating. Mention is made of this patent only to indicate that it is known to recycle a portion of the first filtrate for preparation of the suspension which is to be admitted to the autoclave. However, since the suspension which is thus admitted to the autoclave lies on the acid side and can bring about an excess acidity of the suspension to be reacted, this system has not found widespread use. It may be observed that the method of the invention does not permit the development of an excess acidity.

The method of the invention has numerous advantages. Firstly, it permits the treatment of molybdenum sulfide concentrates which can have a large particle size component, i.e. particles of a size greater than 74 microns, without difficulty. It might be expected that such large particle size molybdenum sulfide concentrates could only be oxidized under pressure with difficulty whereas in the system of the invention it turns out that such particles are oxidized with ease.

Secondly and, indeed, surprisingly, encrustation problems do not arise in the autoclave even though an extremely high suspension density is used in the system according to the invention. Even with such high suspension densities, a sufficiently precise temperature control is maintained by adjustment of the suspension density that the reaction is effected reproducibly even where there are changes in the composition of the molybdenum sulfide concentrate which is used. The reaction is carried out, moreover, at relatively low oxygen partial pressure and thus oxygen losses are reduced or, put otherwise, per unit volume, less oxygen is lost in the system.

The autogenous temperature control operates effectively and without problems, especially when the oxygen partial pressure is maintained in the range of 1 to 5 bar and the temperature in the autoclave is maintained in the range of 230° to 245° C. Because only a single stage recirculation is carried out, at comparatively low energy costs, the continuous process can bring about a yield of 90% molybdenum and more.

BRIEF DESCRIPTION OF THE DRAWING

The above and other objects, features and advantages of the present invention will become more readily apparent from the following description, reference being made to the accompanying drawing in which the sole FIGURE is a flow diagram illustrating the present invention.

SPECIFIC DESCRIPTION AND EXAMPLE

In the drawing, we have shown a slurrying unit 1 in which the molybdenum sulfide concentrate from a hopper 25 via a metering device 26 is dispensed into the aqueous phase which may be formed by water introduced by a valve 21 or recycled second filtrate as controlled by a valve 22, to form a suspension adapted to be fed to the autoclave.

The slurrying stage 1 is also provided with a mixing motor 23 whose blades are represented at 24 to ensure a thorough dispersal of the solids in the aqueous phase and homogeneity of the suspension.

The suspension is fed via line 2 and a pump 3 into the autoclave 4. The autoclave 4 is provided with a stirrer 27 and with baffles 28, 30 and 31 defining an undulating path for the suspension. In addition, means is provided as is represented at 5 for feeding oxygen into the autoclave, the oxygen partial pressure being controlled by a valve which has been represented at 32. The partial pressure within the autoclave is preferably maintained at about 1 to 5 bar although a maximum oxygen partial pressure of up to 10 bar can be used.

A vent is provided at 29 to hold back the oxygen pressure but to release it when an excess partial pressure is built up in the autoclave.

The oxidized suspension is discharged from the autoclave via line 6 into a filter 7. In the filter 7 molybdenum oxide is separated out and discharged at 8 while the first filtrate is fed to a precipitation reactor 10 or a neutralization stage in which the solution is neutralized by the addition of limestone thereto. The limestone is fed from a hopper 11 by an appropriate metering unit.

The calcium carbonate reacts with the sulfuric acid in the reactor to produce carbon dioxide which is discharged at 40 and a suspension of calcium sulfate dihydrate, i.e. gypsum, in the aqueous phase. This suspension of gypsum is fed at 41 to a further filter 12. In the filter 12, the gypsum is filtered out as represented at 13 while the resulting second filtrate, via a pump 15 and as controlled by the valve 16 is recirculated to the slurrying stage 1.

The operation of the device will be described in greater detail in connection with an example although it should be noted that a controller 18 is provided to respond to a sensor 17 of the temperature within the autoclave 4. The sensor 17 is connected to the controller 18 via line 19. The controller 18, in turn, controls the valve 21 via the line 20a or the valve 32 via the line 20b to regulate either or both of the water addition or the oxygen feed to control the density of the slurry or suspension transferred to the autoclave or the oxygen partial pressure in accordance with the temperature.

In the slurrying unit 1 the molybdenum sulfide concentrate suspension is made up first with water and thereafter with make-up water and recirculated second filtrate so that the suspension has a suspension density of about 150 g/l.

This suspension is fed by the pump 3 continuously at the rate of 200 l/h at ambient temperature into the autoclave 4. After an initial heating to 170° C., the temperature in the autoclave is maintained between 230° and 245° C. by the exothermicity of the reaction. Via the unit 5, 45 kg/h of oxygen is introduced so that the oxygen partial pressure in the autoclave is maintained at about 5 bar.

Via line 6 and a valve not shown the oxidized suspension is fed to the filter 7 and 27 kg/h of molybdenum oxide are filtered off at 8 while the filtrate is introduced into the neutralizer 10 in which it is reacted with 34 kg/h of calcium carbonate.

The resulting gypsum is discharged at 13 at a rate of 45 kg/h of the calcium sulfate dihydrate.

The partially neutralized second filtrate containing 20 g/l sulfuric acid is recirculated via line 14 by pump 15 and valve 16 at a rate of 200 l/h to the slurrying unit 1. 30 kg/h of fresh molybdenum sulfide concentrate is combined therewith. The suspension density thus established generates sufficient heat so that no external heating of the autoclave or the remainder of the system is necessary.

As a result of expansion, venting of inert gases, filtration off of the molybdenum oxide and of the gypsum and the like, water is lost at a rate of about 100 l/h and the corresponding water deficiency can be returned to the system by adding 100 l/h of water by washing the molybdenum oxide and the gypsum and returning the washed liquid to the cycle with the second filtrate. Once steady state conditions have been reached, control of the temperature in the reactor and the pressure therein is maintained by the controller 18 by either controlling the make-up water added at 21 or the oxygen partial pressure via the valve 32 in the manner previously described.

3000 kg of molybdenum disulfide concentrate of the following analysis is reacted in the manner described:

| Sieve analysis: | | |
|---|---|---|
| Mo = 53.7% | + 100 mesh | 0.8% |
| Cu = 1.2% | −100 + 150 mesh | 4.0% |
| Fe = 1.7% | −150 + 200 mesh | 15.2% |
| S = 38.8% | −200 + 270 mesh | 12.8% |
| $H_2O$ = 3.8% | −270 + 325 mesh | 16.4% |
| Oil = 2.1% | −325 + 400 mesh | 15.6% |
| | −400 mesh | 35.2% |

The product is 2528 kg of $MoO_3$ with the following composition:
Mo=63.1%
Cu=0.015%
Fe=0.3%
S=0.04%

This corresponded to a molybdenum yield or recovery of 99%.

When the temperature in the autoclave 4 tended to fall by reason of higher gangue content of the molybdenum sulfide concentrate or reduction in the escape of water from the system, additional molybdenum sulfide concentrate was added to the suspension and/or the water supply was reduced to increase the suspension density. When, however, the temperature in the autoclave 4 increased by reason of an increased flotation oil content in the molybdenum disulfide concentrate, the feed of water to the molybdenum sulfide suspension was increased to reduce the suspension density.

To compensate for brief fluctuations in the temperature, the oxygen partial pressure was controlled, e.g. by reducing the partial pressure to about 3 bar and the oxygen feed rate to about 40 kg/h. This resulted in a reduction in the autoclave temperature almost instantaneously.

Corrosion problems were avoided by maintaining the oxidizing conditions continuously. These oxidizing conditions could be maintained easily in part because of the continuous recirculation of the second filtrate with its increasing copper content. It thus was indeed surprising that the corrosion problems did not arise even though brief reductions in the oxygen partial pressure were effected by the control system.

We claim:

1. A method of producing molybdenum oxide which comprises the steps of:

(a) forming an aqueous suspension of a molybdenum sulfide impurity containing concentrate having a mean particle size in the range of 20 microns to 90 microns;

(b) subjecting the suspension produced in step (a) to an elevated oxygen partial pressure and an elevated temperature in an autoclave to oxidize the molybdenum sulfide of said concentrate to molybdenum oxide and produce another suspension, while maintaining the suspension density during oxidation within a range between 100 and 150 g of solids per liter;

(c) controlling the temperature and pressure in said autoclave by monitoring the temperature therein and adjusting the suspension density of the suspension fed from step (a) to said autoclave in response to the temperature in said autoclave;

(d) filtering said other suspension to recover molybdenum oxide therefrom and produce a first filtrate containing sulfuric acid;

(e) neutralizing said first filtrate at least partially by adding lime or limestone thereto to produce a third suspension containing calcium sulfate;

(f) filtering said third suspension to recover calcium sulfate and produce a second filtrate;

(g) recirculating said second filtrate to step (a) as the recirculated liquid, step (c) responding to a fall in temperature in said autoclave by increasing the suspension density and to a rise in temperature in said autoclave by adding water in step (a) to the suspension formed therein; and (h) additionally controlling temperature and pressure in said autoclave at least in part for brief fluctuations in temperature in the autoclave by varying the oxygen partial pressure in said autoclave so as to reduce the temperature by reducing the oxygen partial pressure, the temperature in said autoclave being maintained between substantially 230° and 245° C. and the oxygen partial pressure in said autoclave being maintained between 1 and 5 bar.

* * * * *